US012557728B2

(12) United States Patent
Smith et al.

(10) Patent No.: US 12,557,728 B2
(45) Date of Patent: Feb. 24, 2026

(54) SOLID DISTRIBUTION SYSTEMS FOR AN AGRICULTURAL SPREADER

(71) Applicant: AGCO Corporation, Duluth, GA (US)

(72) Inventors: Evan Thomas Smith, Spirit Lake, IA (US); David Pell, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 72 days.

(21) Appl. No.: 18/765,618

(22) Filed: Jul. 8, 2024

(65) Prior Publication Data

US 2025/0057073 A1      Feb. 20, 2025

Related U.S. Application Data

(60) Provisional application No. 63/520,236, filed on Aug. 17, 2023.

(51) Int. Cl.
   *A01C 7/08*        (2006.01)
   *A01C 15/02*       (2006.01)
(52) U.S. Cl.
   CPC .................................. *A01C 15/02* (2013.01)
(58) Field of Classification Search
   CPC .......... A01C 7/081; A01C 7/082; A01C 15/04
   USPC ......................................................... 111/174
   See application file for complete search history.

(56) References Cited

U.S. PATENT DOCUMENTS

| | | | | |
|---|---|---|---|---|
| 4,529,104 A | * | 7/1985 | Tyler | E01H 10/007 |
| | | | | 222/630 |
| 4,569,486 A | * | 2/1986 | Balmer | A01C 15/04 |
| | | | | 239/522 |

| | | | | |
|---|---|---|---|---|
| 4,790,484 A | * | 12/1988 | Wall | A01M 9/003 |
| | | | | 239/168 |
| 4,793,742 A | * | 12/1988 | Strand | A01M 9/003 |
| | | | | 406/79 |
| 4,872,785 A | * | 10/1989 | Schrage | A01C 7/081 |
| | | | | 406/41 |
| 4,886,208 A | * | 12/1989 | Strand | A01M 11/00 |
| | | | | 239/662 |
| 4,964,575 A | * | 10/1990 | Takata | A01M 9/003 |
| | | | | 239/689 |

(Continued)

FOREIGN PATENT DOCUMENTS

| | | | | | | |
|---|---|---|---|---|---|---|
| EP | | 0160370 A1 | * | 11/1985 | ............. | A01C 7/082 |
| GB | | 2232048 B | * | 10/1993 | ............. | A01C 15/04 |
| WO | 1991017648 A1 | | | 11/1991 | | |

OTHER PUBLICATIONS

UK Intellectual Property Office, Search Report for related UK Application No. GB2313303.6, dated Feb. 15, 2024, 4 pages.

*Primary Examiner* — Joseph A Dillon, Jr.

(57)        ABSTRACT

A solid distribution system of an agricultural spreader includes a product hopper configured to contain solid particulate material, a blower, a manifold coupled to the blower and having a plurality of outlets, at least one boom arm comprising a plurality of parallel rigid tubes configured to carry the solid particulate material and air from the blower, and a plurality of hoses. The manifold is configured to split air flow from the blower into flows through each of the plurality of outlets. Each valve is in fluid communication with one of the outlets and one of the rigid tubes, and each valve individually controls flow through a respective one of the rigid tubes. Vehicles having such solid distribution systems are also disclosed.

10 Claims, 6 Drawing Sheets

(56)                  References Cited

U.S. PATENT DOCUMENTS

| | | | | |
|---|---|---|---|---|
| 4,989,784 | A * | 2/1991 | Fairchild | A01C 7/084 239/114 |
| 5,052,627 | A * | 10/1991 | Balmer | A01C 15/122 239/655 |
| 5,125,583 | A * | 6/1992 | Strand | A01M 9/003 406/79 |
| 5,575,225 | A * | 11/1996 | Smith | A01C 15/003 111/925 |
| 7,162,962 | B2 * | 1/2007 | Fuessel | A01C 7/081 138/44 |
| 7,555,990 | B2 * | 7/2009 | Beaujot | A01C 21/005 111/175 |
| 7,640,873 | B2 * | 1/2010 | Chiavario | A01C 7/102 111/175 |
| 8,635,963 | B2 * | 1/2014 | Friggstad | A01C 7/084 111/175 |
| 9,148,990 | B2 * | 10/2015 | Redman | A01C 7/081 |
| 9,155,243 | B2 * | 10/2015 | Heintzman | A01C 7/206 |
| 9,615,506 | B2 * | 4/2017 | Ruppert | A01M 9/0053 |
| 10,136,575 | B2 * | 11/2018 | Snyder | A01C 7/082 |
| 10,813,280 | B2 * | 10/2020 | Gray | A01C 15/006 |
| 10,918,013 | B2 * | 2/2021 | Gray | A01C 7/20 |
| 10,942,053 | B2 * | 3/2021 | Nedved | A01C 15/006 |
| 11,154,004 | B2 * | 10/2021 | Snipes | A01C 7/105 |
| 11,259,459 | B2 * | 3/2022 | Ruppert | B65G 53/06 |
| 11,617,298 | B2 * | 4/2023 | Ruppert | A01M 9/003 222/71 |
| 11,622,497 | B2 * | 4/2023 | Quinney | A01C 7/208 111/170 |
| 11,930,735 | B2 * | 3/2024 | Jagow | A01C 7/084 |
| 11,986,852 | B2 * | 5/2024 | Nelson | A01C 17/001 |
| 11,997,941 | B2 * | 6/2024 | Snipes | A01C 7/081 |
| 12,058,955 | B2 * | 8/2024 | Gray | A01C 7/082 |
| 12,356,886 | B2 * | 7/2025 | Snipes | G01F 1/00 |
| 12,408,581 | B2 * | 9/2025 | Molder | A01C 15/006 |
| 2004/0250742 | A1 * | 12/2004 | Fuessel | A01C 15/04 111/175 |
| 2019/0021221 | A1 * | 1/2019 | Roberge | B01F 33/404 |
| 2021/0204470 | A1 * | 7/2021 | Tollefsrud | A01M 9/003 |
| 2021/0219487 | A1 * | 7/2021 | Pederson | A01C 19/02 |
| 2021/0229937 | A1 * | 7/2021 | Borkgren | A01C 15/04 |
| 2022/0210965 | A1 * | 7/2022 | Gray | A01C 7/082 |
| 2022/0355334 | A1 * | 11/2022 | Nelson | A01C 17/006 |
| 2024/0023478 | A1 * | 1/2024 | Molder | A01C 7/081 |
| 2025/0057074 | A1 * | 2/2025 | Smith | A01C 15/006 |
| 2025/0268124 | A1 * | 8/2025 | Stoeckli | A01C 7/082 |

* cited by examiner

SOLID DISTRIBUTION SYSTEMS FOR AN AGRICULTURAL SPREADER

CROSS-REFERENCE TO RELATED APPLICATIONS

This application claims the benefit of the filing date of U.S. Provisional Patent Application 63/520,236, "Solid Distribution Systems for an Agricultural Spreader," filed Aug. 17, 2023, the entire disclosure of which is incorporated herein by reference.

FIELD

Embodiments of the present disclosure relate generally to solid material distribution systems for crops, and more particularly to systems having a boom.

BACKGROUND

High crop yields of modern agribusiness may require application of fertilizers, pesticides, and/or herbicides. Dispersing these chemicals onto high-acreage fields requires specialized machines mounted on or towed by a vehicle. An example of such a machine is the self-propelled dry fertilizer applicator.

Dry fertilizer applicators often use "air booms" extending outward from a vehicle chassis. Conveyors transfer fertilizer or other solid material and direct volumetrically metered material into a high-speed air stream to move the material from the conveyor out to deflectors, which scatter the material over the ground. The boom has tubes or hoses of various lengths to connect to deflectors at different distances from the chassis. Air is forced from a blower into a rectangular box, where it is then delivered through orifices aligning with each boom tube to provide airflow across all of the tubes on the booms.

To cover more acres with a machine, boom sizes—and therefore application widths—are increasing. Some inefficiencies in conventional designs become more significant when scaled up, or when operating limits are approached.

BRIEF SUMMARY

In some embodiments, a solid distribution system of an agricultural spreader includes a product hopper configured to contain solid particulate material, a blower, a manifold coupled to the blower and having a plurality of outlets, at least one boom arm comprising a plurality of parallel rigid tubes configured to carry the solid particulate material and air from the blower, and a plurality of valves. The manifold is configured to split air flow from the blower into flows through each of the plurality of outlets. Each valve is in fluid communication with one of the outlets and one of the rigid tubes, and each valve individually controls flow through a respective one of the rigid tubes.

In further embodiments, the solid distribution system may include a distributor configured to deliver the solid particulate material from the product hopper to each of the parallel rigid tubes. The distributor may include, for example, a conveyor belt or other means to move solid particulate material, and a housing configured to direct an approximately equal amount of material to each of the rigid tubes. The distributor may be configured to pass the solid particulate material to the parallel rigid tubes without passing through the valves.

Each of the parallel rigid tubes of the at least one boom arm are of a different length, such that each can carry solid particulate material to a different part of the field.

Some embodiments also include a plurality of hoses, each hose connecting one of the valves to one of the parallel rigid tubes. An outlet of each of the hoses is axially aligned with a respective parallel rigid tube. The hoses connect to respective rigid tubes at an inboard end. The system includes outlets at outboard ends of each rigid tube.

In certain embodiments, the solid distribution system may include a second blower, a second manifold coupled to the second blower and having a second plurality of outlets, a second boom comprising a second plurality of parallel rigid tubes configured to carry the solid particulate material and air from the second blower, and a second plurality of valves. The second manifold is configured to split air flow from the blower into flows through each of the second plurality of outlets. Each valve of the second plurality of valves is in fluid communication with one of the second manifold outlets and one of the second parallel rigid tubes, and each valve of the second plurality individually controls flow through a respective one of the second parallel rigid tubes.

Some embodiments include a vehicle having the disclosed solid distribution system.

Within the scope of this disclosure, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1A:
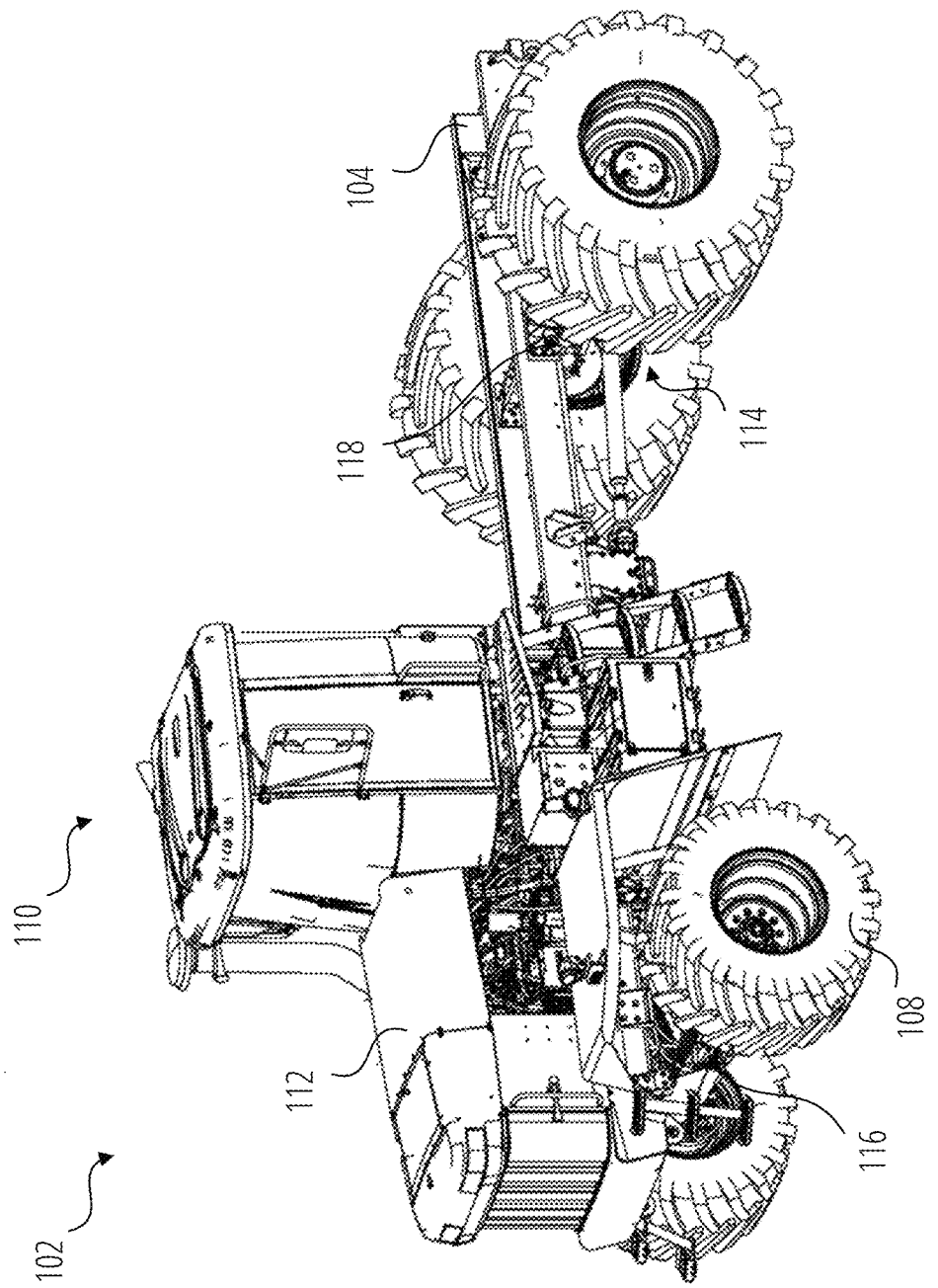
FIG. 1A shows a perspective view of a vehicle chassis that can be equipped with a solid distribution system.

The illustrations presented herein are not actual views of any spreader system or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used throughout, ranges are used as shorthand for describing each and every value that is within the range. Any value within the range can be selected as the terminus of the range.

Figure 1B:
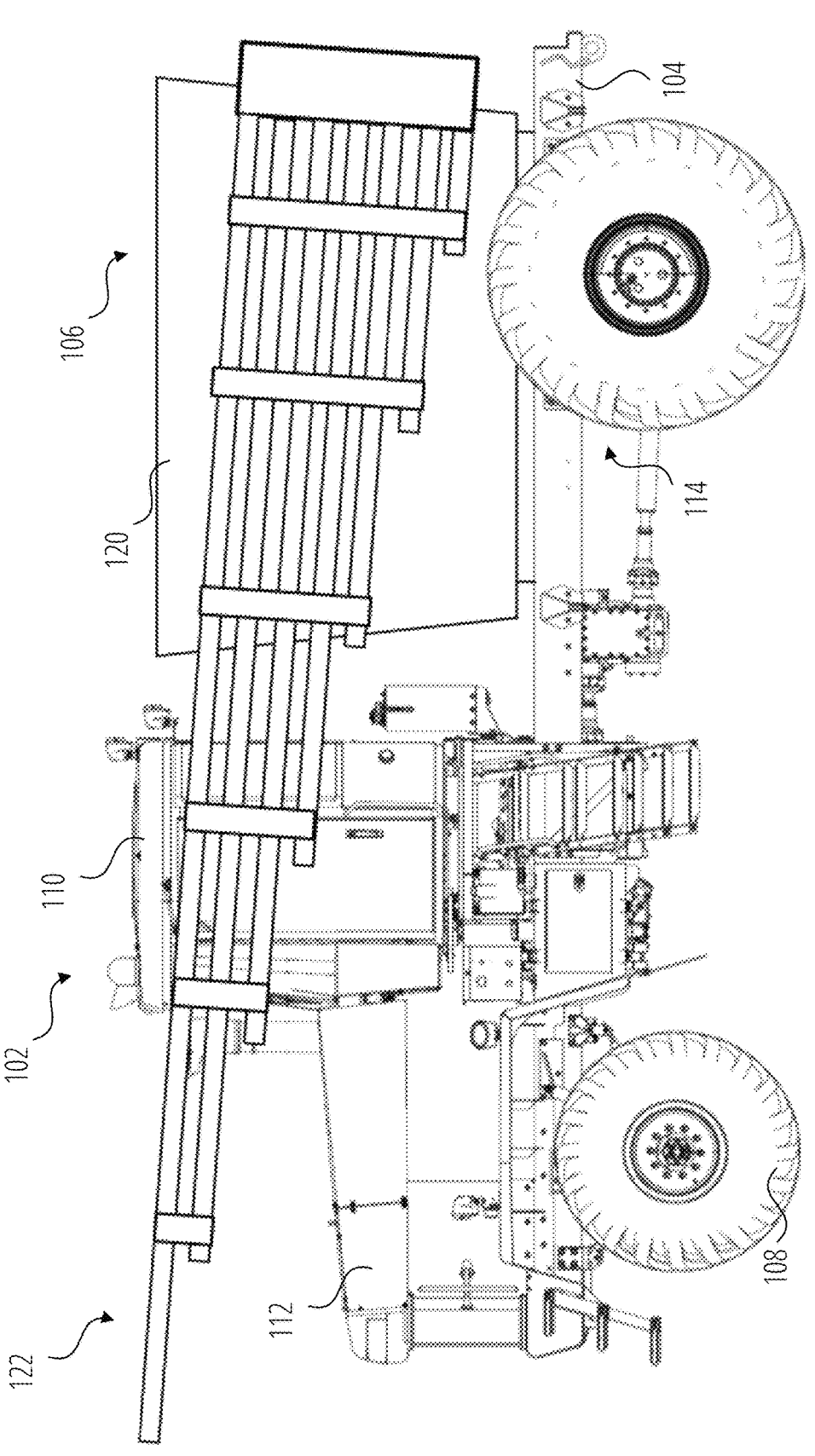
FIG. 1B shows a side view the vehicle of FIG. 1A, with the solid distribution system shown.

FIG. 1A is a perspective view of a portion of a vehicle 102 (e.g., an agricultural spreader). FIG. 1B is a side view of the vehicle 102 of FIG. 1A. Some components of the vehicle 102 have been omitted from FIG. 1A for simplicity of illustration and to better show features of the vehicle 102.

Referring to FIG. 1A and FIG. 1B together, the vehicle 102 may include a chassis 104, a solid distribution system 106, a plurality of wheels 108 or other ground-engaging elements supporting the chassis 104 above a ground surface, an operator cabin 110, and an engine compartment 112. A plurality of suspension assemblies 114 may be interposed between the wheels 108 and the chassis 104 to provide suspension and/or steering functions. In some embodiments, the suspension assemblies 114 may further provide height adjustment. In some embodiments, the vehicle 102 may include a suspension assembly 114 for each wheel 108. In some embodiments, the vehicle 102 may include at least one suspension assembly 114 for each axle.

The vehicle 102 includes a pair of front wheels 108 coupled to a front axle 116 and a pair of rear wheels 108 coupled to a rear axle 118 of the appropriate size and shape to allow the vehicle 102 to travel among row crops with minimal crop disturbance. As used herein, a "wheel" includes an inner, rigid wheel and an outer, flexible tire mounted on the inner wheel, unless otherwise specified. The particular size, shape, and configuration of the wheels 108 may vary substantially from one embodiment to another. In some embodiments, the vehicle 102 may include ground-engaging elements other than wheels, such as tracks, skis, etc. Hereinafter, reference will be made to a "wheel 108" or "wheels 108" with the understanding that the illustrated wheels 108 may be replaced with other types of ground-engaging elements.

The solid distribution system 106 is supported on the chassis 104 and may be useful for distributing solid products (e.g., fertilizer) in a field. As shown in FIG. 1B, the solid distribution system 106 includes a product hopper 120 and extendible boom arms 122 (of which only one is shown in FIG. 1B) for applying the product from the product hopper 120 to a crop or field. The boom arm 122 may be configured to fold for transport, as shown in FIG. 1B, and unfold for field operations. The product hopper 120 is configured to contain solid particulate material, and may have a capacity of between, for example, 100 cubic feet (2.83 cubic meters) and 400 cubic feet (11.32 cubic meters); however, any size may be selected based on design parameters.

Figure 2:
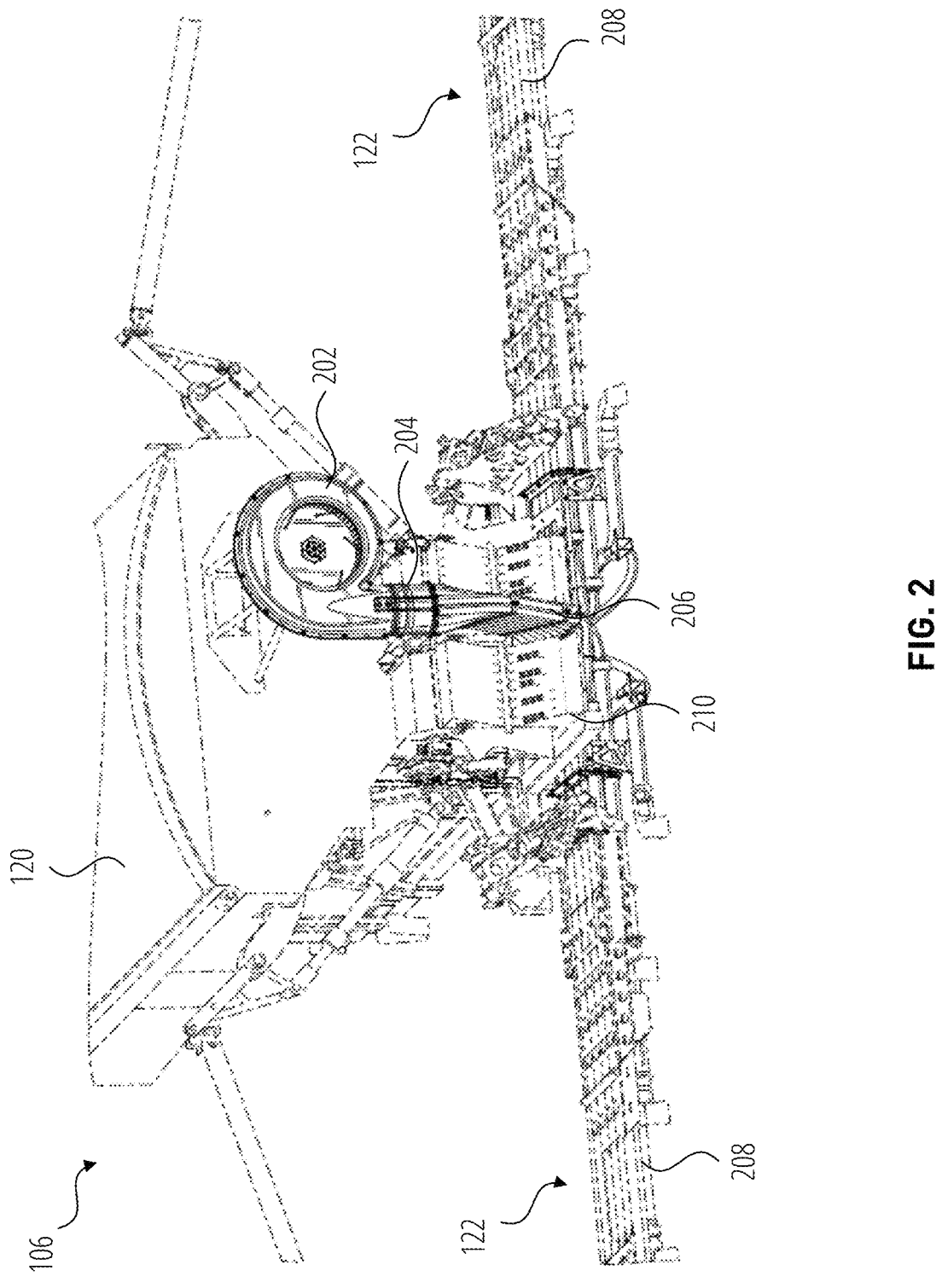
FIG. 2 is a simplified perspective view of a solid distribution system.

FIG. 2 is a simplified perspective view of the solid distribution system 106 of FIG. 1B when the boom arms 122 are unfolded for field use. The solid distribution system 106 includes a blower 202 (e.g., a centrifugal fan) and a manifold 204 coupled to the blower 202 and having a plurality of outlets. The manifold 204 is configured to split air flow from the blower 202 into flows through each of the plurality of outlets. Hoses 206 are connected from each of the outlets of the manifold 204 to one of the rigid tubes 208. Thus, the air flow from the blower 202 is split into as many individual flows as necessary, and delivered to the rigid tubes 208 on the boom arms 122. Each boom arm 122 has multiple rigid tubes 208 of different lengths, so that the end of each rigid tube 208 can apply solid particulate material to the field a different distance from the vehicle 102. At the outboard end of each rigid tube 208 is a solid outlet, which may include a strike plate or other device to direct the solid particulate material toward the field.

The solid distribution system 106 also includes a distributor 210 to deliver solid particulate material to each of the rigid tubes 208.

Figure 3:
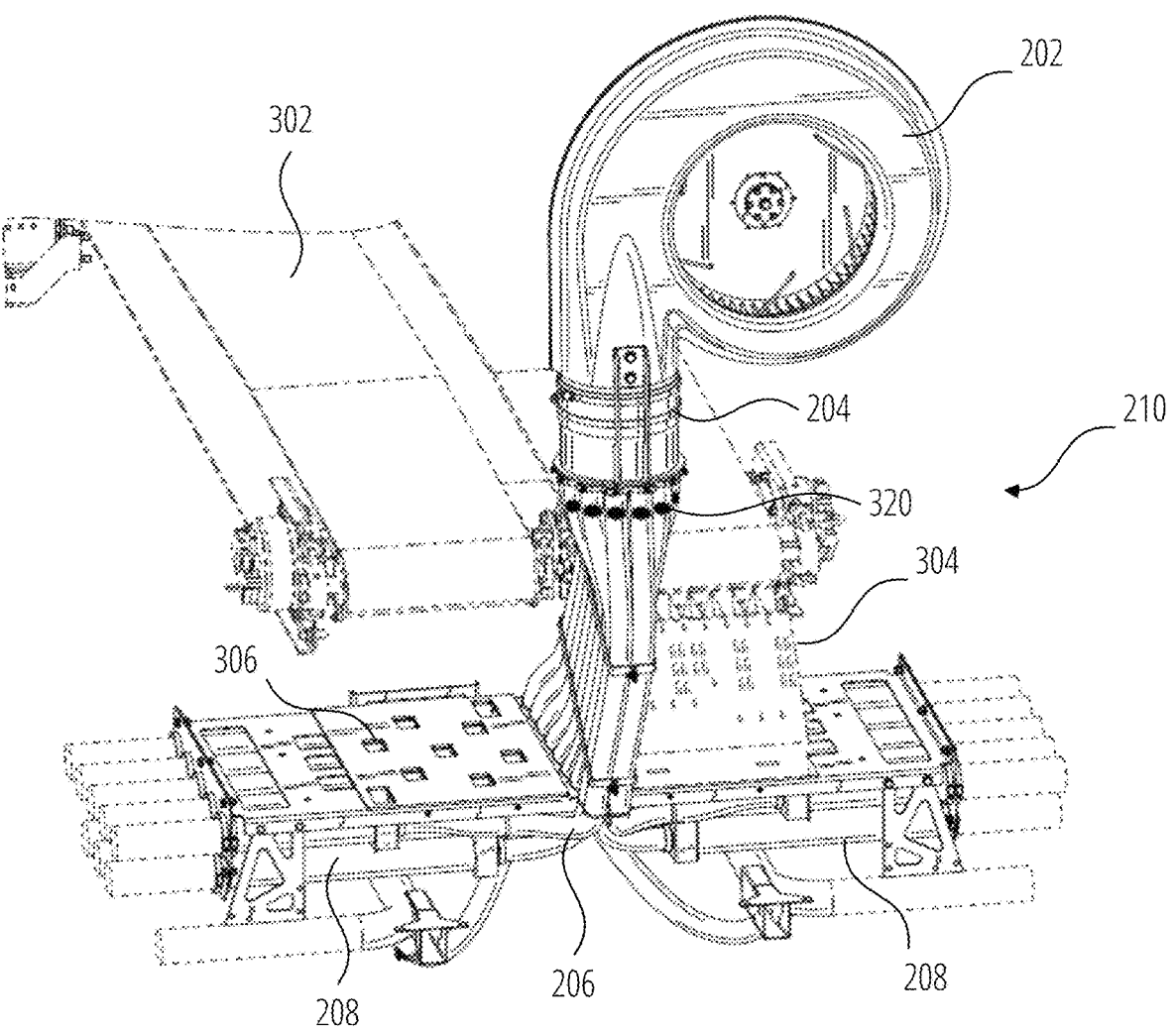
FIG. 3 is a simplified perspective view of details of the solid distribution system of FIG. 2.

FIG. 3 is a simplified perspective view of portions of the solid distribution system 106, including the blower 202, the manifold 204, the hoses 206, parts of the rigid tubes 208, and parts of the distributor 210. The distributor 210 includes a conveyor belt 302 that carries solid particulate material from the product hopper 120 (FIG. 2) to a housing 304, which in turn is shaped to deliver the solid particulate material to the rigid tubes 208. For example, the housing 304 may be shaped generally as a triangular prism, having a triangular cross section in a plane oriented vertically and in a forward-and-aft direction. The housing 304 may be referred to in the art as a funnel box. The distributor 210 may include more than one such housing 304. In FIG. 3, the distributor 210 includes two housings 304, but the left side housing 304 is omitted from view to better show other parts of the distributor 210.

The housing 304 may define a plurality of exits 306, each of which is open to a respective one of the rigid tubes 208. Thus, the distributor 210, including the housing 304, can deliver the solid particulate material to each of the rigid tubes 208. Furthermore, the housing 304 can direct an approximately equal amount of solid particulate material to each rigid tube 208.

The distributor 210 can include one or more than one conveyor belt 302 and one or more than one housing 304. For example, and as shown in FIG. 3, the distributor 210 can include a conveyor belt 302 and a housing 304 for each boom arm 122. In alternative embodiments, the distributor 210 can include another conveyance device to move the solid particulate material from the product hopper 120 to the housing 304. For example, U.S. Patent Publication 2021/0219487 A1, "Sectional Control Funnel Box," published Jul. 22, 2021, describes a motor-driven auger for moving solid particulate material. This document also illustrates another possible shape of the housing 304 in FIGS. 2A-4B.

The exits 306 of the housing 304 are open to the rigid tubes 208 so that the solid particulate material can drop into each rigid tube 208. The hoses 206 are connected to the rigid tubes 208 upstream of the exits 306, so that the air in the rigid tubes 208 is flowing in a generally straight path along the rigid tubes 208 at the exits 306. (The astute reader will notice that the exits 306 are really entrances to the rigid tubes 208, in addition to exits from the housing 304. For consistency, they are referred to as exits 306 throughout.)

The distributor 210 may include a plurality of valves 320, each in fluid communication with the manifold 204 and one of the rigid tubes 208, such as via the hoses 206. In other embodiments, the hoses 206 may be omitted, and the manifold 204 may be connected to the rigid tubes 208 directly, with the valves 320 as part of the manifold 204 or part of the rigid tubes 208. Each valve 320 individually controls flow through a respective one of the rigid tubes 208. Each valve 320 may be, for example, a butterfly valve controllable by an actuator. The valves 320 may be controllable by a controller located, for example, in the operator cabin 110 of the vehicle 102.

When the solid distribution system 106 is in use, the distributor 210 passes the solid particulate material from the product hopper 120 to the parallel rigid tubes 208 without passing through the valves 320. One benefit of this arrangement is that the solid particulate material cannot clog the valves 320. Another benefit is that air flow can be turned off for parts of the boom where solid particulate material is not to be applied. Thus, the blower speed can be reduced when less than all of the rigid tubes 208 are in use. Because the blower 202 is a significant energy user, lowering the blower speed can save a significant amount of energy, particularly in irregularly shaped fields and along edges where the boom width is greater than the width of the field remaining to be treated.

Furthermore, if hoses 206 are used between the manifold 204 and the rigid tubes 208, the flow is generally in one direction (outward along the boom arm 122) when the solid particulate material enters the air flow. The hoses 206 have bends between the blower 202 and the rigid tubes 208 to enable bundling the solid distribution system 106 into available physical space and providing structural support. The hoses 206 split the flow from the blower 202 farther upstream than a conventional flow manifold (which is commonly a generally rectangular box having an input on one side for the blower and outputs on another side to rigid tubes). The outlet of each hose 206 is axially aligned with its respective rigid tube 208. Though the hoses 206 of the solid distribution system 106 have bends, the flow effects of splitting the air flow into multiple streams are felt near the blower 202. Thus, by the time the air enters the rigid tubes 208, the flow is generally parallel and steady-state. The hoses 206 may even out the effects of turbulence and other flow irregularities, so that when the solid particulate material drops into the rigid tubes 208, it can be more uniformly entrained in the flow.

Figure 4A:
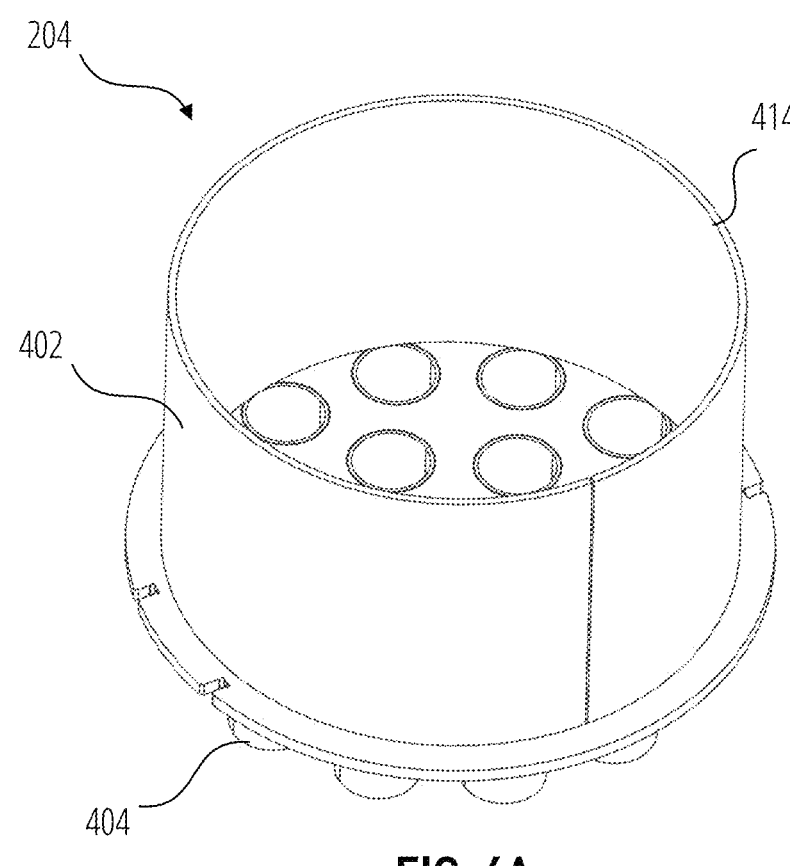
FIG. 4A is a simplified perspective view of a manifold of the solid distribution system of FIG. 2.
Figure 4B:
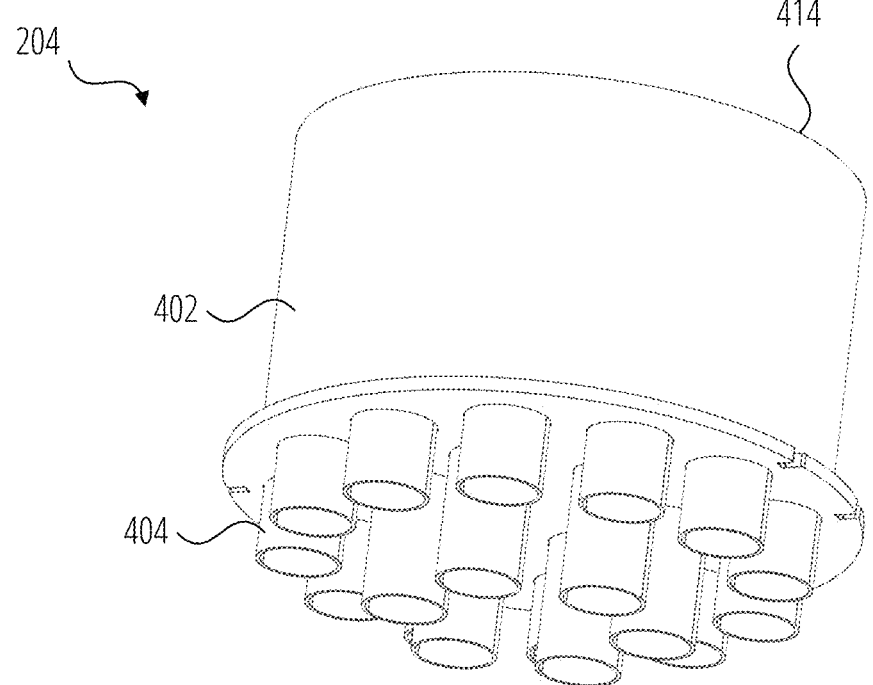
FIG. 4B is another simplified perspective view of the manifold of FIG. 4A.

FIG. 4A and FIG. 4B are simplified perspective views of the manifold 204, which show how the manifold 204 splits the flow from the blower 202. The exterior 402 of the manifold 204 is generally cylindrical, and an inlet 414 at a first end of the manifold 204 matches the outlet of the blower 202 (e.g., may be approximately the same diameter, or of a diameter slightly larger or smaller to accommodate connecting the manifold 204 with the blower 202. The opposite end of the manifold 204 has a number of manifold outlets 404 equal to the number of valves 320 and rigid tubes 208. The manifold outlets 404 may be spaced in a pattern to promote approximately equal flow through each manifold outlet 404 when all the valves 320 are open.

Figure 5:
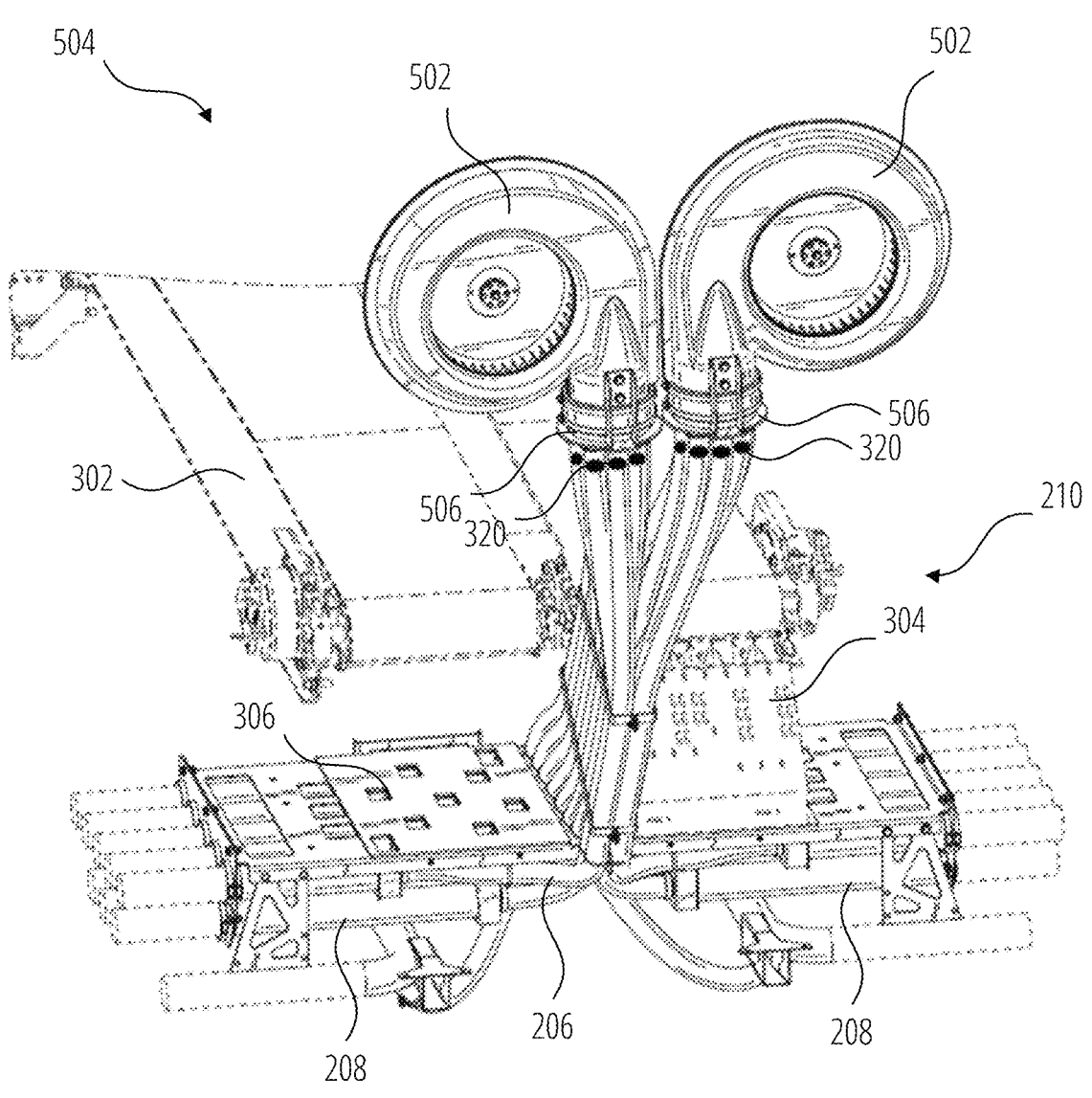
FIG. 5 is a simplified perspective view of another solid distribution system.

FIG. 5 is a simplified perspective view of portions of another solid distribution system 504 having two blowers 502 instead of one. The solid distribution system 504 operates as the solid distribution system 106 described above. Each blower 502 is coupled to its own manifold 506 having outlets with valves 320. Each blower 502 can supply air to one of the boom arms 122.

The use of a second blower 502 may be useful for various reasons. For example, it may be easier to fit parts into a particular space, it may reduce overall power consumption, parts may be more readily available, etc. Furthermore, if two blowers 502 are used, one blower 502 may be entirely turned off when solid particulate material is to be distributed from only one boom arm 122. Thus, having multiple blowers 502 can offer design and operational flexibility. Though two blowers 502 are shown in FIG. 5, any number of blowers may be used.

All references cited herein are incorporated herein in their entireties. If there is a conflict between definitions herein and in an incorporated reference, the definition herein shall control.

What is claimed is:

1. A solid distribution system of an agricultural spreader, comprising:
   a product hopper configured to contain solid particulate material;
   at least one blower;
   at least one manifold coupled to the at least one blower and having a plurality of outlets, wherein the manifold is configured to split air flow from the at least one blower into flows through each of the plurality of outlets;

a first boom arm and a second boom arm extending in opposing directions from the manifold, each boom arm comprising a plurality of parallel rigid tubes configured to carry the solid particulate material and air from the at least one blower;

a plurality of valves, each valve in fluid communication with one of the outlets and one of the rigid tubes, wherein each valve individually controls flow through a respective one of the rigid tubes; and a distributor configured to pass the solid particulate material from the product hopper to the parallel rigid tubes without passing through the valves.

2. The solid distribution system of claim 1, wherein the distributor comprises a conveyor belt.

3. The solid distribution system of claim 1, wherein the distributor comprises a housing configured to direct an approximately equal amount of material to each of the rigid tubes.

4. The solid distribution system of claim 1, wherein the distributor defines a plurality of exits, wherein each exit is open to a respective parallel rigid tube.

5. The solid distribution system of claim 1, further comprising a plurality of hoses, each hose connecting one of the valves to one of the parallel rigid tubes.

6. The solid distribution system of claim 5, wherein an outlet of each of the hoses is axially aligned with a respective parallel rigid tube.

7. The solid distribution system of claim 1, wherein each of the parallel rigid tubes of the first boom arm are of a different length, and wherein each of the parallel rigid tubes of the second boom arm are of a different length.

8. The solid distribution system of claim 1, further comprising an outlet at an outboard end of each rigid tube.

9. The solid distribution system of claim 1, wherein:

the at least one blower comprises a first blower and a second blower;

the at least one manifold comprises a first manifold and a second manifold, wherein the first manifold is coupled to the first blower and the second manifold is coupled to the second blower;

the first boom arm is configured to carry the solid particulate material and air from the first blower; and the second boom arm is configured to carry the solid particulate material and air from the second blower.

10. A vehicle comprising the solid distribution system of claim 1.

* * * * *